(12) United States Patent
Malkin et al.

(10) Patent No.: US 6,311,206 B1
(45) Date of Patent: Oct. 30, 2001

(54) METHOD AND APPARATUS FOR PROVIDING AWARENESS-TRIGGERED PUSH

(75) Inventors: Peter Kenneth Malkin, Ardsley; Philip Shi-lung Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/231,081

(22) Filed: Jan. 13, 1999

(51) Int. Cl.[7] .............................. G06F 13/00; G06F 11/30
(52) U.S. Cl. ........................ 709/202; 709/224; 709/203; 709/219; 707/10
(58) Field of Search ................................... 709/203, 224, 709/202, 219; 707/10

(56) References Cited

U.S. PATENT DOCUMENTS

| | | | | |
|---|---|---|---|---|
| 5,708,834 | * | 1/1998 | Sasaki et al. ...................... | 709/203 |
| 5,861,883 | * | 1/1999 | Cuomo et al. ...................... | 345/326 |
| 5,915,207 | * | 6/1999 | Dao et al. ................................ | 455/9 |
| 5,987,430 | * | 11/1999 | Van Horne et al. ................... | 705/34 |
| 6,026,430 | * | 2/2000 | Butman et al. ...................... | 709/203 |
| 6,029,196 | * | 2/2000 | Lenz ...................................... | 709/221 |
| 6,035,423 | * | 3/2000 | Hodges et al. ........................ | 714/38 |
| 6,195,678 | * | 2/2001 | Komuro ................................ | 709/202 |
| 6,240,453 | * | 5/2001 | Chang et al. ......................... | 709/226 |

* cited by examiner

*Primary Examiner*—Kenneth R. Coulter
(74) *Attorney, Agent, or Firm*—Scully, Scott, Murphy & Presser; Gail H. Zarick, Esq.

(57) ABSTRACT

A method and a computer program device for pushing data from at least one source entity to at least one client entity over a network, a client entity being characterized as having a particular operating state. The method and computer program device comprise the steps of: transferring data from the at least one source entity to a push proxy entity for subsequent transmission of the data to the client entity; requesting a notification regarding the particular state of the client entity; monitoring a state of the client entity until the client entity is in the particular operating state and sending a notification communicating the state to the push proxy entity; and transferring data to the client entity in response to receiving the notification. The state notification may specify push information, which may be used to determine a least expensive device to which to transfer given data. The state notification also reduces the network-polling load by initiating each poll.

34 Claims, 7 Drawing Sheets

METHOD AND APPARATUS FOR PROVIDING AWARENESS-TRIGGERED PUSH

BACKGROUND OF THE INVENTION

1. Field of the Invention

The present invention is related to data transmission in a computer network, and more particularly to a unique data push technology where data is transmitted to recipients according to a particular state of the intended recipients.

2. Description of Prior Art

The standard client-server information push model is not efficient for pervasive computing (PvC) entities, which for the most part are disconnected from the network. Servers uselessly attempting to push data to disconnected clients waste resources, such as the CPU, the RAM, and the network bandwidth in the process.

Push

In a standard push model, such as HTTP Push, a given push source server (PSS) sends out new information to all subscribed clients. This works well in networks where clients are actively connected to the network most of the time and the network has sufficient bandwidth for the transmission. Such clients are able to receive the transmissions. However, because PvC devices are mostly disconnected from the network, this model fails since the majority of the transmissions will fail.

Push source servers may attempt to avoid transmissions to disconnected clients by checking the availability of the target clients before each transmission. This approach still results in heavy network load due to the large number of status checking probes.

Pull

If any given client machine was forced to request all information sent to it, e.g., using the HTTP GET request, then every data transmission would be guaranteed to be sent to an available client. The problem with the pull scenario is that because there is no way for a given client to know when or if a given source server has any new information, the client is forced to make many unnecessary pull requests to ensure that any and all new information is retrieved. This will result in a heavy network load due to the large number of unnecessary pull requests.

Poll

Yet another approach, similar to the pull technique, is polling, like that used by the PointCast Network http://www.pointcast.com, an Internet news service broadcasting personalized news and information directly to clients' computer screens. In polling, just as with the pull approach, additional network load is created by clients having to continually request information from source servers, even when no new information is in fact available, to ensure that any and all new data is retrieved.

Since PvC entities are already bandwidth-challenged, there remains a need for a way to enable an automated delivery of information, especially for that which is critical, yet only infrequently provided, such as bug fixes or virus checker updates.

SUMMARY OF THE INVENTION

In accordance with the aforementioned needs, the present invention is directed to a method and an apparatus for enabling a network server to trigger the transfer of data from a source server to a client entity, especially such that is often disconnected, like a PvC device, based on the client entity's particular state, like a connection to the network, for instance. The network server, which will be referred to as an "awareness server," provides access to the transient status information of the network client entities, such as users, devices, applications, etc. The status information specifies whether a given device is connected to the network, a given user is logged, and whether a given user is actively participating in a given application. The process by which the awareness server triggers data transfers comprises the following steps:

the source server requesting the awareness server to notify it when a specific client entity is in a particular state;

the client entity being in or entering the particular state;

the awareness server sending a notification to the requesting server after learning of the specific client entity's state; and the source server receiving the notification and transferring data to the specific client entity.

The awareness server may also initiate data transfers from an intermediate proxy server in which push requests from source servers to target client entities are queued. Other methods are also provided to enable awareness notifications to be generated based on different criteria including:

whether a given client entity is connected and the manner of the connection, for example, the target client entity becomes TCP/IP linked at speeds of 14.4 Kbps or faster;

whether a given client entity is executing a particular application, for example, a web browser, and the manner of the execution;

whether a connection to a given client entity is secured and the manner of the connection, for example, when the target client entity becomes linked using SSL;

whether or not a given user is currently connected to the network, returning the network address of the user's current device in the notification; and who is using a given client entity, for example, when the target client entity is being used by a particular user.

Methods are further provided for the awareness server to obtain state information by:

actively monitoring requested state and state changes;

learning of states or state changes from the target client entities themselves; and learning of states or state changes from other servers, for example, learning from an Internet Access Provider when a given client is connected to the network.

Additional methods are provided for:

specifying information required for pushes in the awareness notifications, e.g., the port number of the application to which to transmit a given push;

determining the least expensive client device to which to transfer the given data, by using the awareness server; and reducing the load of polling on the network, such as that done by network SNMP-based management servers, by initiating each poll by an awareness notification.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

In the preferred embodiment, the present invention is directed to a method and apparatus for providing HTTP PUSH transmissions. Those skilled in the art will understand that other types of transmissions, including but not limited to e-mail and multimedia broadcast may be handled similarly.

Figure 1:
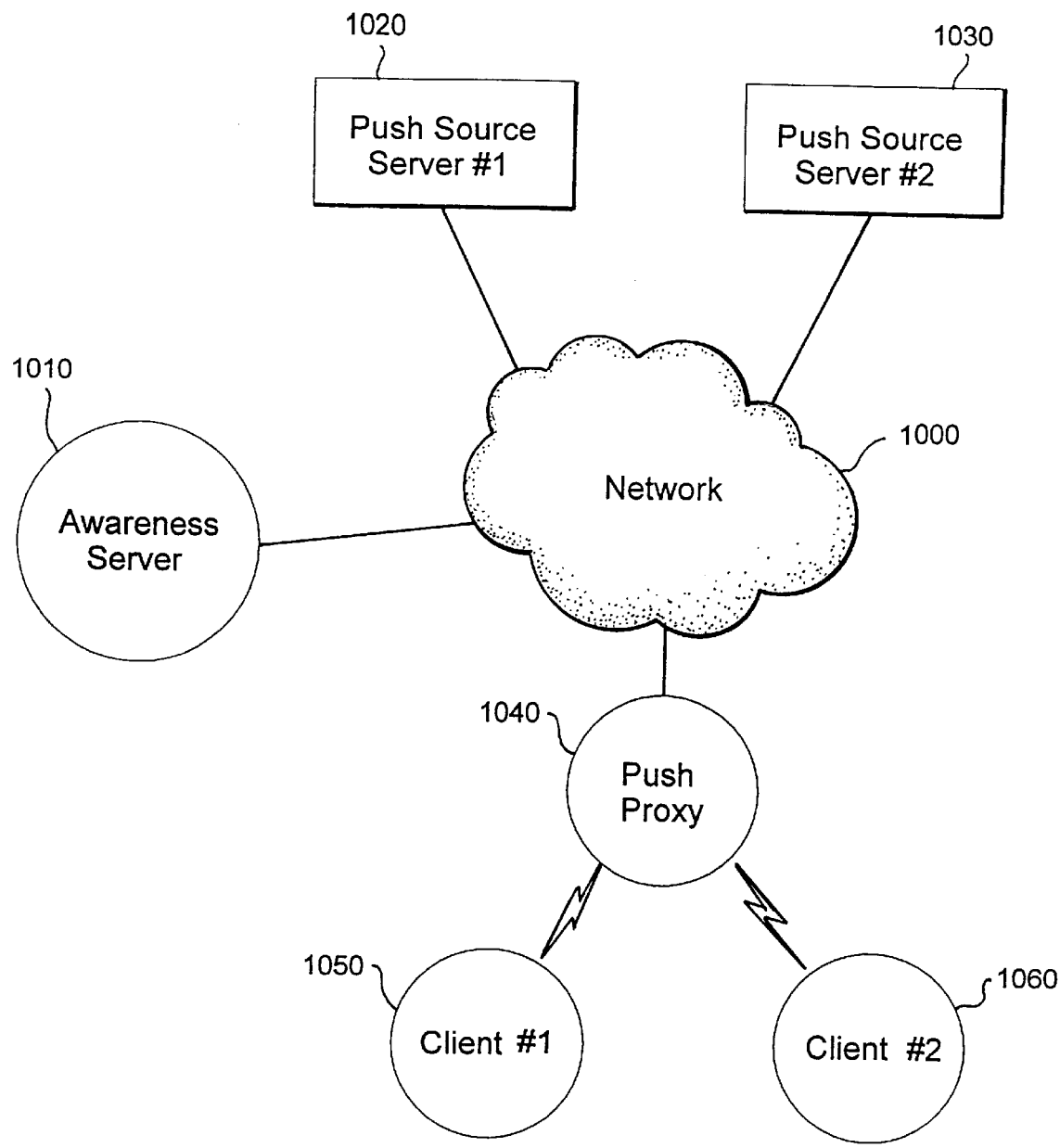
FIG. 1 is a diagram of a network having features of the present invention including a standalone push proxy.

FIG. 1 shows a diagram of an overall logical network topology. PSS 1020, 1030, an awareness server 1010, and a push proxy server 1040 are directly connected to the network 1000. Some examples of the network 1000 include, but are not limited to, the Internet, the World Wide Web, an Intranet and local area networks (LANs).

The client devices 1050, 1060 are locally connected to the push proxy server 1040. All communication between the clients 1050, 1060 and the network 1000, passes through the push proxy server 1040. Although only two PSS 1020, 1030 are depicted, it is understood that the present invention is applicable to any number of such servers. Similarly, the present invention is applicable to any number of clients.

The PSS 1020, 1030 are essentially standard HTTP servers including, but not limited to IBM's Internet Connection Server (ICS) . The only unique feature of the PSS 1020, 1030 is that they route all pushes through a particular push proxy server 1040. This feature may be added to an ICS-based server using ICS' API (ICSAPI), which enables the development and inclusion of modules that customize the behavior of the ICS server. An ICS server may be configured to hand off control to such a module at a particular point during the processing of requests. The module may perform its task and then either return control to the server to complete the transmission, or complete the transmission itself and notify the server when it is done.

In the case of the PSS 1020, 1030 the added module takes control before the data is finally pushed to the subscribed client 1050, 1060 and, rather than sending the data to the client 1050, 1060, connects to the push proxy 1040 and specifies where the data should be sent. This proxy routing is part of the HTTP standard specified in HTTPD RFC. The awareness server 1010, the PSS 1020, 1030 and the push proxy server 1040 may be implemented on any computing nodes including, but not limited to products, such as IBM S/390 SYSPLEX, SP2, or RS6000 workstations.

The clients 1050, 1060 may include an IBM WorkPad, a PC, various workstations, set top box, etc. The software running on the clients 1050, 1060 may include, but is not limited to, the Netscape's Navigator web browser.

Figure 2:
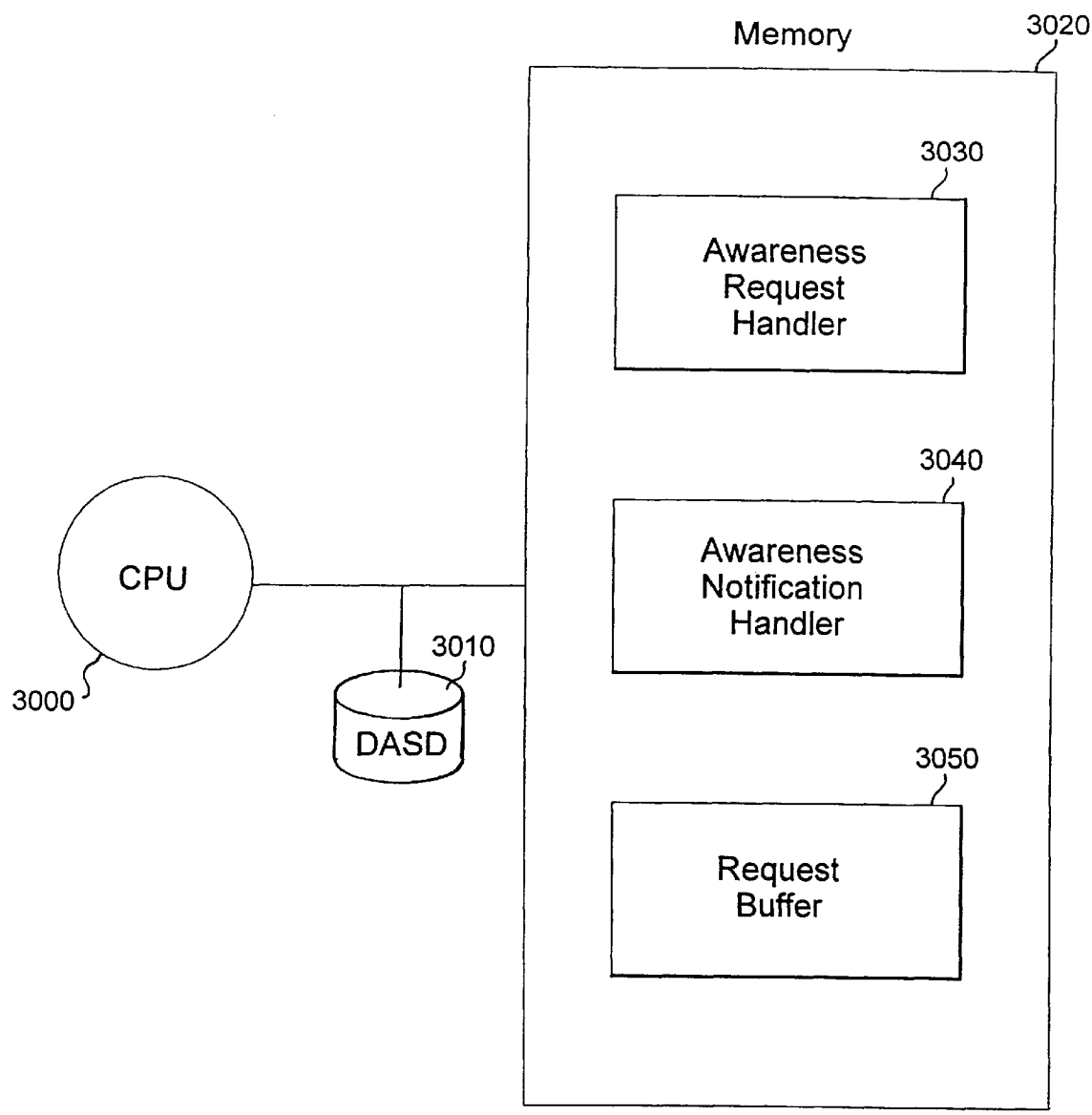
FIG. 2 is a component diagram of an awareness server.

The awareness server 1010 provides notification of when the specified clients or targets have reached a desired state, for example, connected to the network. As shown in FIG. 2 the awareness server 1010 (FIG. 1) includes a CPU 3000, a memory 3020, such as RAM, and a storage device 3010, such as a disk or other direct access storage device (DASD).

The awareness server 1010 (FIG. 1) logic preferably embodied as executable computer code, is loaded in to the memory 3020, either remotely over the network or locally from an optical CD-ROM, magnetic storage, such as disk, or DASD 3010, for execution by CPU 3000. The executable computer code loaded into memory 3020 preferably includes an awareness request handler 3030 to accept and to service a clients' requests, an awareness notification handler 3040 to notify clients of the status of their requests, and a request buffer 3050 to store current requests.

Figure 3:
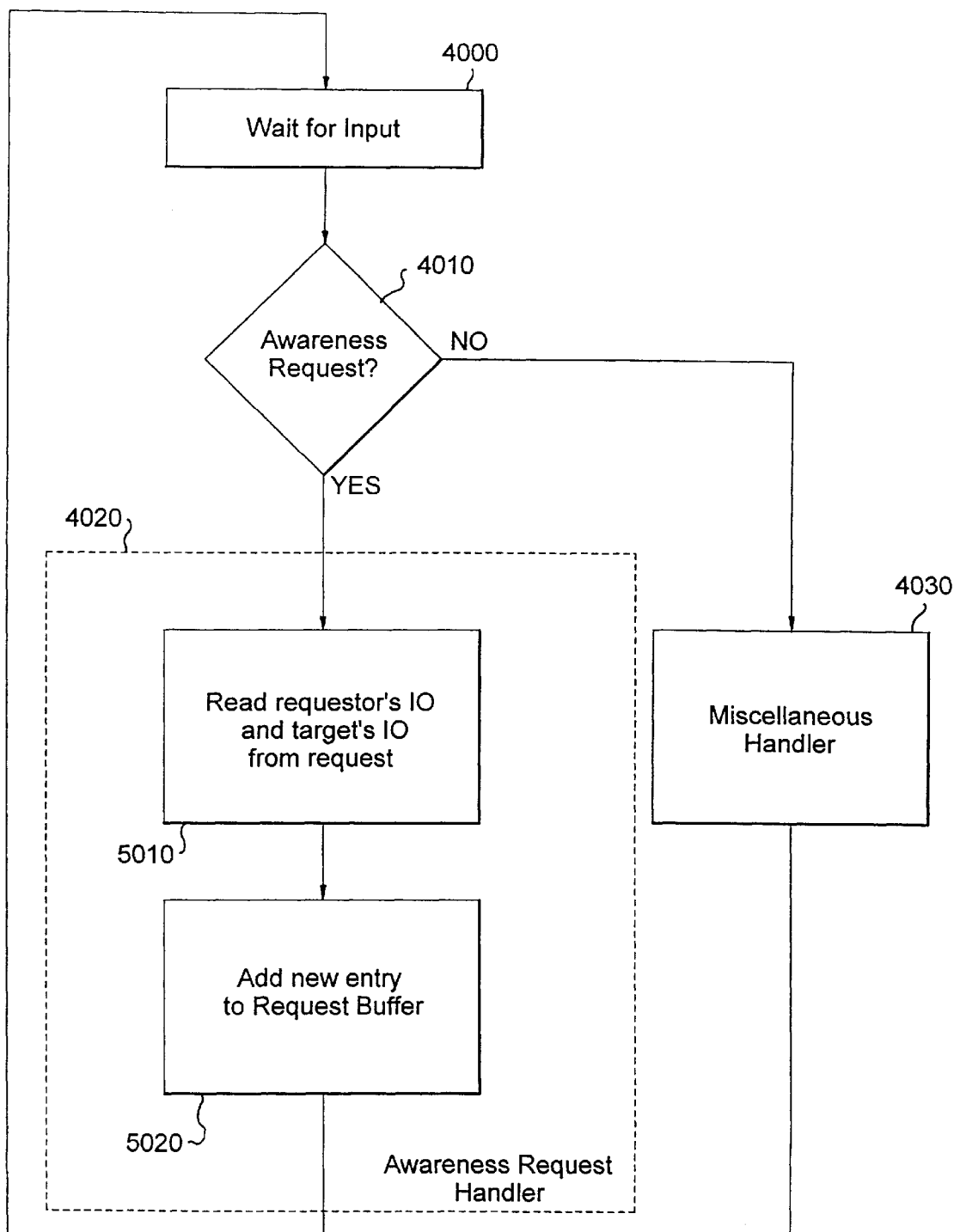
FIG. 3 is a flow diagram of the awareness server logic including the awareness request handler.

As shown in FIG. 3 the awareness server 1010 (FIG. 1) waits for input in step 4000, possible inputs including requests for status notification received from the network. After the input is received, step 4010 determines whether the input is an awareness request, i.e., a request to notify that a specified client has reached a particular state. If the request is not a request for status notification, then a miscellaneous handler is invoked in step 4030. Following the execution of the miscellaneous handler in step 4030, the program control returns to step 4000 to wait for further input.

However, if the input is an awareness notification request, then the awareness request handler 4020 is invoked. At step 5010 the request handler reads the requestor's and the target client's IDs from the request, e.g., the hostname of the server asking to be notified and the hostname of the client device whose status is being announced. At step 5020, the awareness request handler 4020 adds a new entry to the request buffer 3050 (FIG. 2) indicating the extracted IDs of the requester and of the target client. Following the execution of the awareness request handler 4020, the program control returns to step 4000 to wait for further input.

Figure 4:
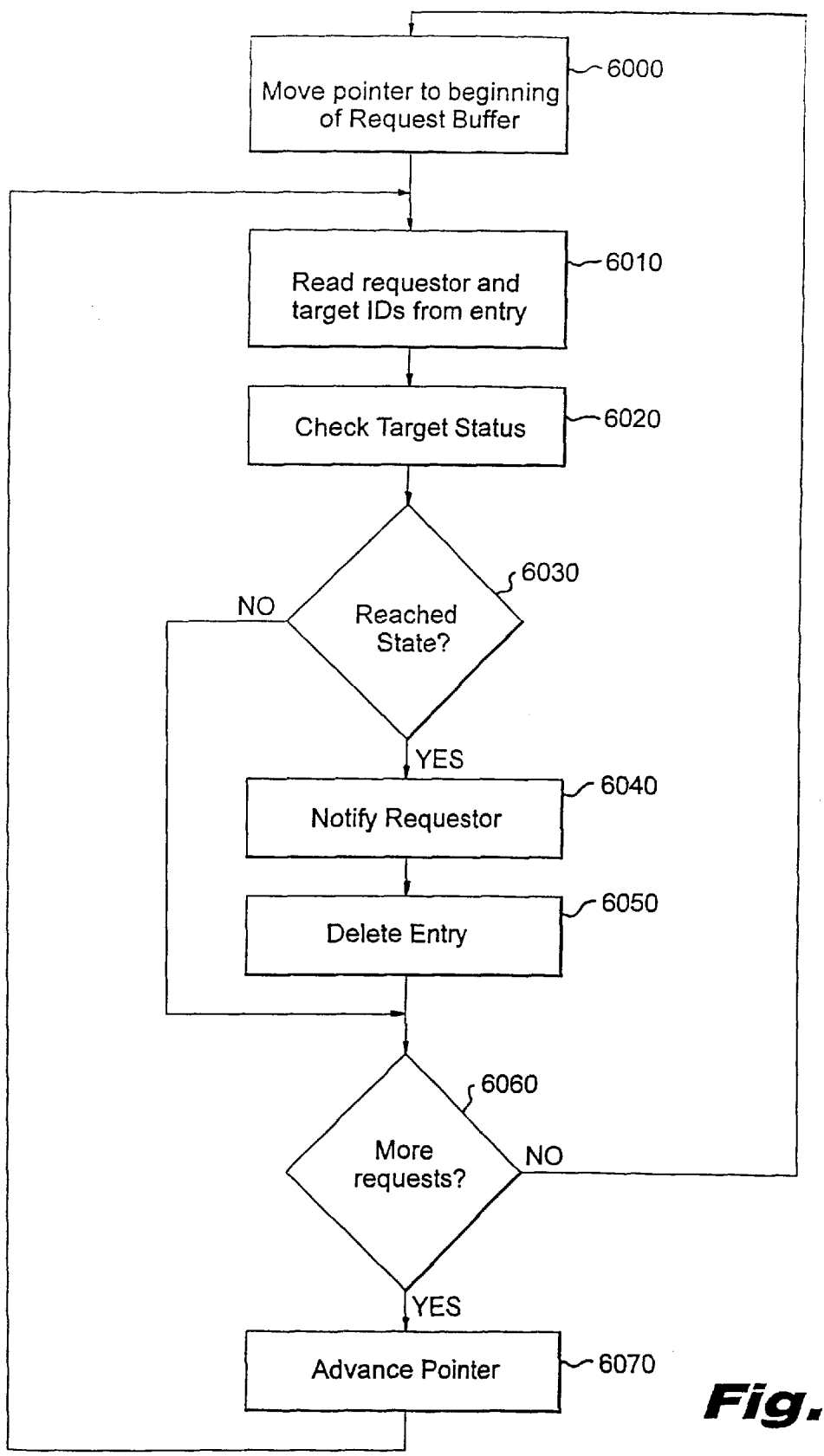
FIG. 4 is a flow diagram of the awareness notification handler.

FIG. 4 shows the processing of the awareness notification handler 3040 (FIG. 2) which is continually running as a background process in the CPU 3000 (FIG. 2) of the awareness server 1010 (FIG. 2).

A local pointer is moved to the first entry in the request buffer 3050 (FIG. 2) in step 6000. The requestor's and the target client's IDs are read from the pointed to entry in step 6010. In step 6020 the status of the target client is checked.

The status may be the connectivity status and may be checked by such programs as PING, or from a notification received from the target client device, i.e., whenever a given client device connects. Ascertaining the status of a given target client actively connected or participating in a particular application may be accomplished by requesting the target client's status from the application server. The awareness server 1010 (FIG. 1) itself may request to be notified by outside servers. For example, it could learn when a given target client connects by asking the target client's Internet access provider for a notification when the given client connects. If a notification is received, then the target client is connected, otherwise the client is still disconnected.

In step 6030 a determination is made whether the target client has reached a desired status. If the target client has reached the desired status, then in step 6040 a notification is sent to the requester using TCP, UDP or any other network transport protocol or higher level applications like e-mail. The current entry is then deleted from the request buffer 3050 (FIG. 2) in step 6050. If however, the target client has not reached the needed status, then steps 6040 and 6050 are skipped.

In step 6060 if it is determined that there are no more requests in the request buffer 3050 (FIG. 2), then processing continues at step 6000. If there are further requests in the request buffer 3050 (FIG. 2), then in step 6070, the local pointer is advances to the next entry, and the processing continues in step 6010.

The awareness server 1010 (FIG. 1) may send notifications for any number of reasons, some of these reasons may include:

- whether a given client entity is connected or the manner of the connection, for example, the target client entity becomes TCP/IP linked at 14.4 Kbps or faster;
- whether a given client entity is running a particular application, e.g., when the target client entity is running a web browser, or the manner of the execution of the application.
- whether a connection to a given client entity is secured and the manner of the connection, for example, a client entity becomes linked using SSL.
- who is using a given client entity, for example, a particular user is the client.

The awareness server 1010 (FIG. 1) may also return critical information in the notifications, such as the port number on which the target client entity's push recipient application, such as a web browser, is running. This critical information may be read and used by the push proxy server 1040 (FIG. 1) when the notification is received.

Figure 5:
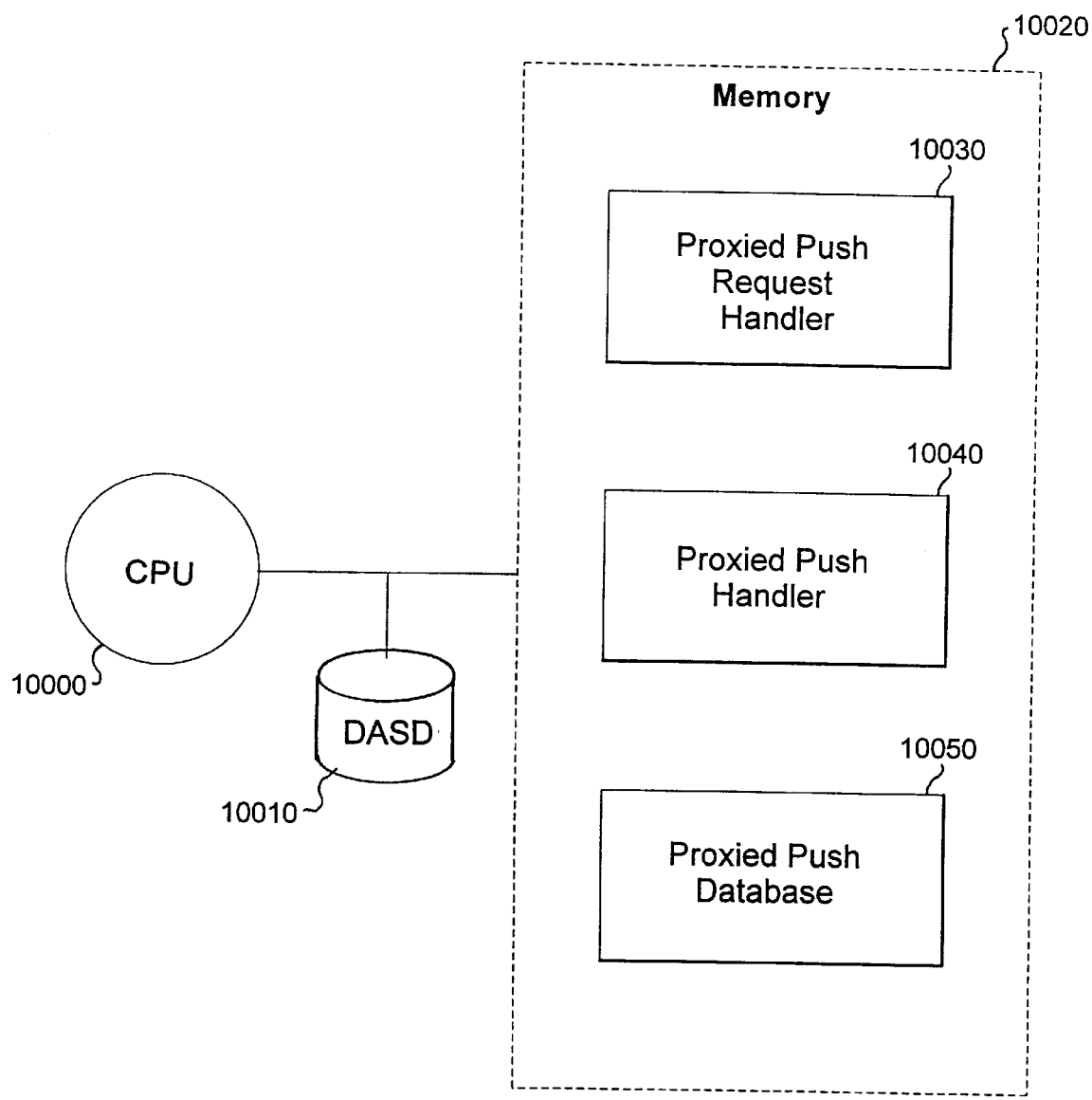
FIG. 5 is a component diagram of a push proxy.

The push proxy server 1040 (FIG. 1) shown in FIG. 5, queues up push requests and executes the final transmission to the target client device after being notified by the awareness server that the given client device is able to receive the transmission. The push proxy server 1040 (FIG. 1) includes a CPU 10000, a memory 10020, such as RAM, and a storage device 10010, such as a disk or a DASD.

According to the present invention, the push proxy logic embodied as executable computer code, may be loaded remotely over the network or locally from an optical CD-ROM or magnetic storage, such as disk, or DASD 10010 into memory 10020 for execution by the CPU 10000. The computer code loaded into the memory 10020 includes a proxied push request handler 10030; a proxied push handler 10040; and a proxied push database 10050 including but not limited to IBM's DB2 Database Product.

Figure 6:
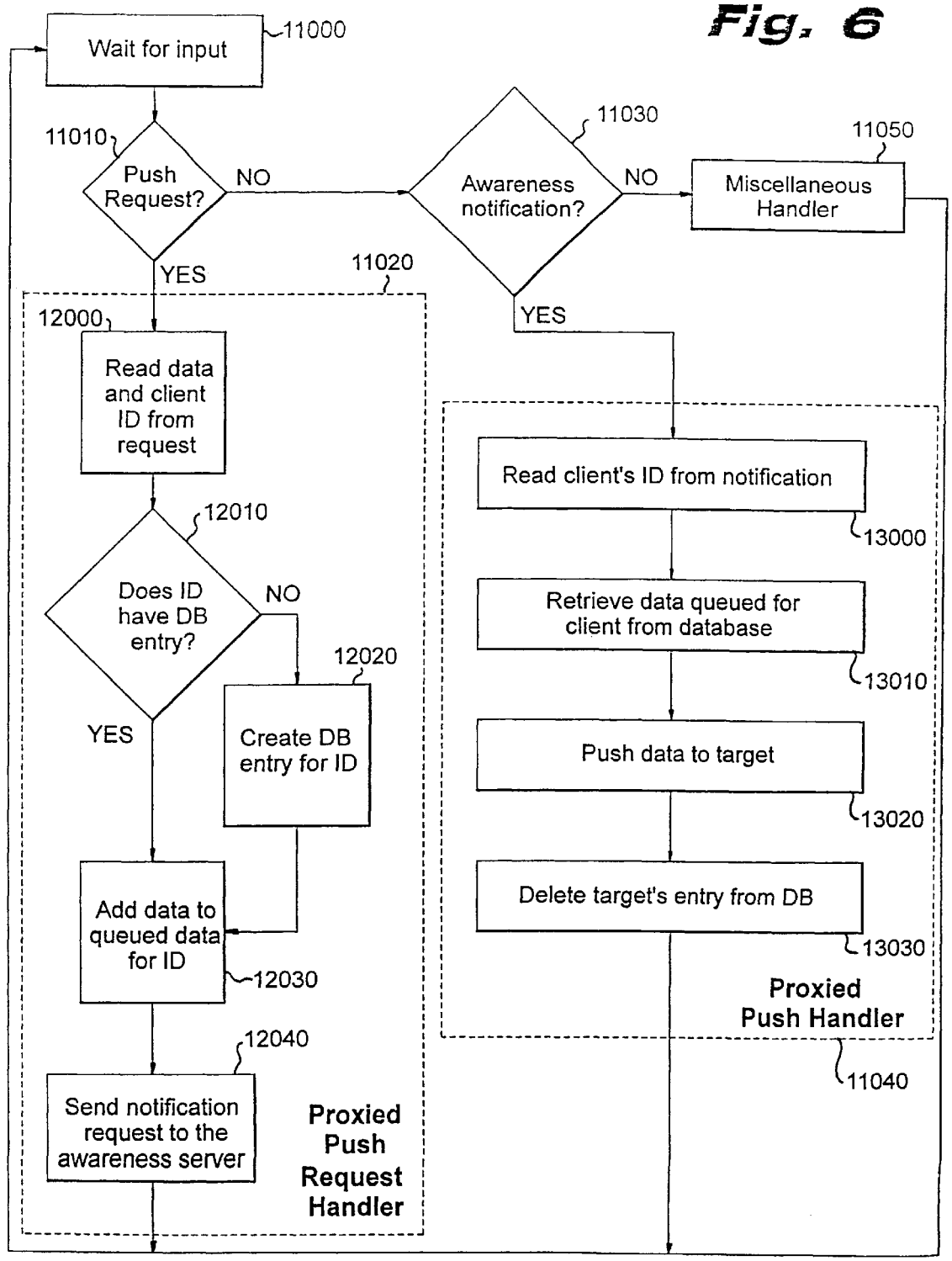
FIG. 6 is a flow diagram of the push proxy logic including the proxied push request handler and the proxied push handler.

FIG. 6 illustrates the push proxy program flow. As shown in FIG. 6, the push proxy waits from input in step 11000. When the input is received, a determination is made in step 11010 whether the input is a PUSH request. If it is a PUSH request, then, the proxied push request handler 11020 is invoked. Otherwise, processing continues in step 11030 where it is determined whether the input is an awareness notification. If the input is an awareness notification, then the proxied push handler 11040 is invoked. Otherwise, if the input is not an awareness notification the appropriate miscellaneous handler is invoked after which the processing continues in step 11000.

The proxied push request handler 11020 queues up the push feeds from the PSS 1020, 1030 (FIG. 1). The data and the target client's ID, such as the client's hostname or the IP address, are read from the request in step 12000. If it is determined in step 12010, that a given ID does not already have an entry in the proxied push database 10050 (FIG. 5), then an entry is created in step 12020.

In step 12030, new data is added to the queued data for the read ID. A notification request is sent to the awareness server 1010 (FIG. 1), in step 12040, specifying the ID for itself and the target client, after which the processing continues in step 11000.

As mentioned, after receiving a notification from the awareness server 1010 (FIG. 1) for a specific client device, the proxied push handler 11040 pushes the queued data to that specific client device.

Particularly, at step 13000, the proxied push handler reads the client's ID from the notification, and retrieves of the data queued for the given ID from the proxied push database 10050 (FIG. 5) at step 13010. Then, at step 13020, this data is pushed to the target client. In step 13030, the proxied push database entry for the given ID is deleted and the processing continues in step 11000.

Sending queued pushes only after being notified that the target client is connected to the network and is listening, eliminates many needless transmission attempts which would have been executed in the absence of this knowledge. This aspect of the present invention may also be used to optimize polling applications, for example, the status polling performed by SNMP-based network management applications. If status requests are only sent when the target network devices are connected, as indicated by notifications from an awareness server, then resource-wasting requests to disconnected devices are eliminated.

Figure 7:
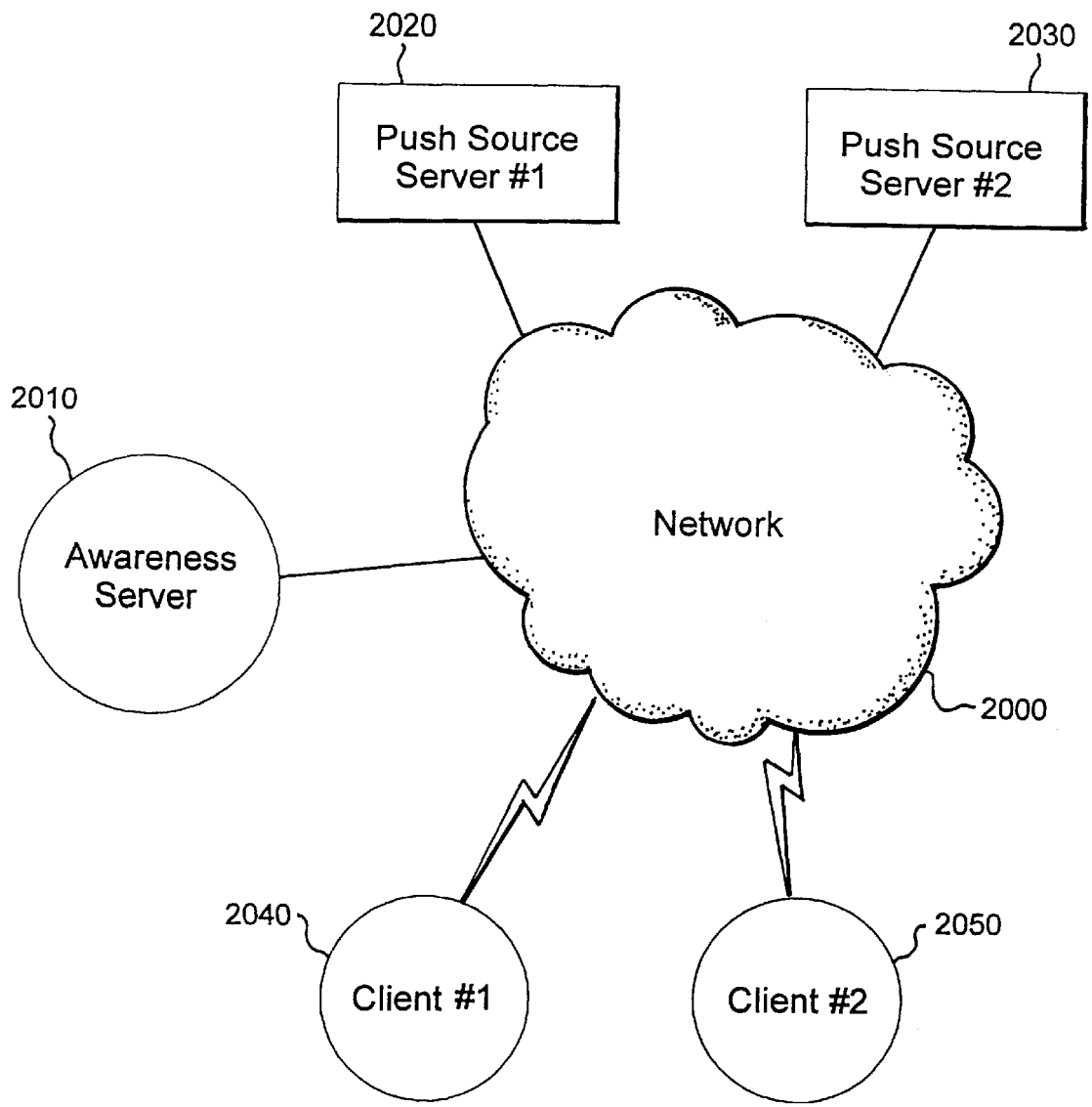
FIG. 7 is a diagram of a network having features of the present invention including server-side push proxies.

As shown in FIG. 7, the push proxy server 1040 (FIG. 1) need not be a standalone machine. Instead of having the push proxy run remotely, each PSS 2020, 2030 may have its own server-side proxy running concurrently in parallel with the PSS system. In this configuration, a given PSS would use its own hostname or IP address as that of the push proxy.

Multiple push proxies may be used to spread out processing and network load. With multiple push proxies, each PSS would have a choice of which one to use. Another way to spread out processing and network load is to employ multiple awareness servers, so that a push proxy may request notification from more than one awareness server.

The target client's ID sent to the awareness server 2010 could be a user ID, such as a name like "Luanda Chen", rather than a device ID, such as a network address like 192.62.1.1. Given a user ID, the awareness server could notify a push proxy when a particular user is connected, specifying the address of the user's current device in the notification.

The awareness server notifications may also be used to route transmissions as inexpensively as possible, for instance, in response to an awareness notification request for a particular user, the awareness server 2010 may determine all the currently available user devices, then determine the least expensive device to which to send data, and finally reply to the notification request with a notification which specifies the address of this device.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for pushing data from at least one source entity to at least one client entity over a network, a client entity being characterized as having a particular operating state, said method comprising the steps of:

a. transferring data from said at least one source entity to a push proxy entity for subsequent transmission of said data to said client entity;

b. requesting a notification regarding said particular state of said client entity;

c. monitoring a state of said client entity until said client entity is in said particular operating state and sending a notification communicating said state to said push proxy entity; and d. transferring data to said client entity in response to receiving said notification.

2. The method of claim 1, wherein said source entity includes said push proxy entity.

3. The method of claim 2, wherein data is transferred using information specified in said notification.

4. The method of claim 3, wherein said particular operating state includes said client entity being connected to said network.

5. The method of claim 4, wherein said particular operating state includes a type of connection of said client entity to said network.

6. The method of claim 3, wherein said particular operating state includes a specific client entity being connected to said network.

7. The method of claim 6, wherein said particular operating state includes a type of connection of said specific client entity to said network.

8. The method of claim 3, wherein said particular operating state includes a specific user being connected to said network, an address of said specific user's current device is returned in said notification.

9. The method of claim 8, wherein said particular operating state includes said specific user using a particular client entity.

10. The method of claim 3, wherein said particular operating state includes said client entity running a particular application.

11. The method of claim 10, wherein said particular operating state includes a manner in which said client is running a particular application.

12. The method of claim 3, wherein said particular operating state is determined by actively monitoring said client entity.

13. The method of claim 12, wherein said active monitoring of said client entity is performed by polling of said client entity on said network.

14. The method of claim 3, wherein said particular operating state is determined by a communication from said client entity.

15. The method of claim 3, wherein said particular operating state is determined by a communication from one or more entities in said network.

16. The method of claim 3, further including a step of determining a least expensive method to transfer said data to said client entity based upon said particular operating state.

17. A system for pushing data from at least one source device to at least one client over a network, a client device being characterized as having a particular operating state, said system comprising the steps of:

a. a push proxy device for receiving data to be pushed to said client from said at least one source device and requesting a notification regarding said particular state of said client entity from a monitoring device in response to receipt of said data;

b. said monitoring device determining a state of said client entity until said client entity is in said particular operating state and sending a notification communicating said state to said push proxy device; and c. said push proxy device transferring data to said client device in response to receiving said notification.

18. The means of claim 17, wherein said source entity includes said push proxy entity.

19. A computer program device readable by a machine, tangibly embodying a program of instructions executable by a machine to perform method steps for pushing data from at least one source entity to at least one client entity over a network, a client entity being characterized as having a particular operating state, said method comprising the steps of:

a. transferring data from said at least one source entity to a push proxy entity for subsequent transmission of said data to said client entity;

b. requesting a notification regarding said particular state of said client entity;

c. monitoring a state of said client entity until said client entity is in said particular operating state and sending a notification communicating said state to said push proxy entity; and d. transferring data to said client entity in response to receiving said notification.

20. The method of claim 19, wherein said source entity includes said push proxy entity.

21. The method of claim 20, wherein data is transferred using information specified in said notification.

22. The method of claim 21, wherein said particular operating state includes said client entity being connected to said network.

23. The method of claim 22, wherein said particular operating state includes a type of connection of said client entity to said network.

24. The method of claim 21, wherein said particular operating state includes a specific client entity being connected to said network.

25. The method of claim 24, wherein said particular operating state includes a type of connection of said specific client entity to said network.

26. The method of claim 21, wherein said particular operating state includes a specific user being connected to said network, an address of said specific user's current device is returned in said notification.

27. The method of claim 26, wherein said particular operating state includes said specific user using a particular client entity.

28. The method of claim 21, wherein said particular operating state includes said client entity running a particular application.

29. The method of claim 28, wherein said particular operating state includes a manner in which said client is running a particular application.

30. The method of claim 21, wherein said particular operating state is determined by actively monitoring said client entity.

31. The method of claim 30, wherein said active monitoring of said client entity is performed by polling of said client entity on said network.

32. The method of claim 21, wherein said particular operating state is determined by a communication from said client entity.

33. The method of claim 21, wherein said particular operating state is determined by a communication from one or more entities in said network.

34. The method of claim 21, further including a step of determining a least expensive method to transfer said data to said client entity based upon said particular operating state.

* * * * *